Sept. 25, 1956

J. MERCIER ET AL 2,764,175

GAUGE CUT-OFF VALVE

Filed June 20, 1952

Fig.1.

Fig.2.

INVENTOR
Jean Mercier
Jacques Mercier
BY
Dean Fairbank & Hirsch
ATTORNEYS

2,764,175
GAUGE CUT-OFF VALVE

Jean Mercier and Jacques Mercier, New York, N. Y.

Application June 20, 1952, Serial No. 294,593

5 Claims. (Cl. 137—109)

This invention relates to cut-off valves, more particularly of the type to cut off a pressure indicating gauge when the pressure in the line to which it is connected rises above a predetermined maximum value.

It is among the objects of the invention to provide a cut-off valve which has but few parts that are not likely to become deranged even with long use and which will dependably and reliably cut off and retain cut off, the flow of liquid to a pressure gauge so long as the pressure in the line to which the gauge is connected is greater than the maximum permissible limit of said gauge, thereby avoiding the likelihood of rapid opening and closing of the valve with resultant objectionable chattering and possible injury to the pressure gauge as a result of the vibration therein caused by intermittent flow of liquid due to such rapid opening and closing of said valve.

According to the invention, these objects are accomplished by the arrangement and combination of elements hereinafter described and particularly recited in the claims.

This application is a continuation-in-part of co-pending application Serial No. 648,711, filed February 19, 1946, now abandoned.

In the accompanying drawings in which are shown one or more of various possible embodiments of the several features of the invention, Fig. 1 is a longitudinal sectional view of the valve, and Fig. 2 is an end view thereof taken along line 2—2 of Fig. 1.

Referring now to the drawing, the gauge cut-off valve desirably comprises an elongated, substantially tubular casing 11 desirably having a longitudinal passageway or bore 12 therethrough. Positioned against an internal annular shoulder 13 formed by an enlargement 14 of said bore 12, is one end 15 of a substantially cylindrical bushing 16 which is retained against said shoulder by means of a liquid inlet fitting 17, screwed into the threaded end 18 of bore 12 and abutting at its inner end 19 against the end 21 of bushing 16.

The bushing 16, which desirably is centrally located along the length of bore 12, desirably has an axial bore 22 therethrough, the ends of which are of enlarged diameter defining valve seats 23 and 24, the former desirably being of larger area than the latter. In order that a liquid tight seal be formed between the bushing 16 and the adjacent wall of bore 12, the bushing 16 desirably has annular grooves 26 therein in each of which an annular seal, desirably an O ring 27, is positioned. A liquid tight seal is also effected between the fitting 17 and the adjacent wall of bore 12 by means of an O ring 28 positioned in an annular groove 29 in said fitting.

The bushing 16 desirably has a relatively wide annular groove 31 between the annular grooves 26, which is in communication through lateral passageways 32, with the bore 22 of said bushing, and said annular groove 31 is in communication through lateral passageway 33, with a threaded port 34 to which a suitable pressure gauge 35 is affixed.

Desirably a pressure accumulator 25 of any suitable type, such as that sold by Greer Hydraulics Inc. of New York city, is connected by line 30 to lateral port 36 in casing 11, which is in communication with groove 31.

Slidably mounted in bore 22 of bushing 16 is a push rod 38 of diameter such that slight clearance or play is afforded between the wall of bore 22 and the outer surface of rod 38. The rod 38 which desirably is of reduced diameter at its mid portion as at 39, is slightly shorter than the length of bushing 16 and protrudes at both of its ends 41, 42 into the valve seats 23, 24, respectively. The end 41 of rod 38 abuts against a valve, illustratively a ball 43 positioned in a substantially cylindrical cavity 44 in the nose end 19 of fitting 17, the diameter of said ball being just slightly smaller than the diameter of the cavity so that the ball may readily move therein. The nose end 19 of fitting 17 desirably has a slot 40 therein so that fluid flowing into cavity 44 may readily pass around the ball 43, which occupies substantially the entire width of the cavity, into bore 22 of bushing 16. Cavity 44 desirably has a concave floor 45 with an axial bore 46 providing communication between cavity 44 and an axial bore 47 of larger diameter than bore 46, and which extends through said fitting 17. The bore 47 desirably has a porous strainer plug 48 therein to filter the liquid flowing into bore 47 through a line (not shown) connected to the internally threaded end 49 of said fitting.

The end 42 of rod 38 abuts against a valve also illustratively a ball 54 positioned in a substantially cylindrical cavity 55 in the end 56 of a ball follower 57, the length of said cavity being substantially equal to the radius of said ball 54 so that the latter will protrude therefrom. The ball follower 57, which desirably is substantially cylindrical, is slidably mounted in the bore 12 of casing 11 and normally urged inwardly in said bore by means of a coil spring 61. Thus the ball 54 will normally be retained on its seat 24 adjacent a lateral discharge passageway 62 in casing 11 which leads into port 63, normally connected by a return line to a reservoir (not shown).

Means are desirably provided to vary the tension of coil spring 61 so that the pressure at which ball 54 will move off its seat 24 may be adjusted. For the purpose a screw 64 threaded into the correspondingly threaded end of bore 12 has an axial recess 60 therein in which the end 65 of coil spring 61 is positioned. Thus upon rotation of the screw in a clockwise or counterclockwise direction, the tension of spring 61 may be adjusted, a lock nut 66 on said screw retaining the latter in set position. Desirably an oil tight seal is effected between the screw and the adjacent wall of bore 12 by means of an O ring 67 positioned in an annular groove 68 in screw 64.

Assuming for purpose of illustration that the maximum permissible range of pressure gauge 35 is 1000 p. s. i., and the area of ball seat 24 is .0625 square inch. The screw 64 is rotated to adjust the tension of coil spring 61 on ball follower 57 so that the ball 54 will be retained on its seat 24 by a force of 62.5 pounds which by the formula $F=PA$ is the unseating force exerted against ball 54 by a pressure of 1000 p. s. i.

As liquid flows through the line (not shown) to which the fitting 17 is connected, such liquid will pass through bore 47, porous filter 48, which removes impurities from the liquid, and thence through axial bore 46 into cavity 44. The pressure of the liquid flowing into cavity 44 will retain ball 43 against the end 41 of push rod 38 and such liquid will flow around ball 43, through slot 40 into the bore 22 of bushing 16 in which the push rod 38 fits with some play.

The liquid will thereupon flow through bore 22 into reduced portion 39 and thence through lateral passageways 32, annular groove 31, passageway 33 and port 34 to pressure gauge 35, which will indicate the pressure in the line to which fitting 17 is connected. In addition a portion of such liquid will pass through the entire length of bore 22 and through seat 24 to abut against ball 54 thereon and will also flow through annular groove 31, port 36, bore 30 into pressure accumulator 25 further to compress the inflated bladder 50 therein.

If the pressure in the line and hence the static pressure on the liquid against ball 54 is less than 1000 p. s. i. as previously pointed out, ball 54 will remain seated.

If the pressure in the line should rise to considerably more than 1000 p. s. i., say 2000 p. s. i., for purpose of illustration, the force of spring 61 will be overcome and ball 54 will move off its seat 24, for flow of liquid through passageway 62 and port 63 to a reservoir (not shown). With the initial movement of ball 54 off its seat 24, the pressure in bore 22 will drop to say 1950 p. s. i. However, even with such drop in pressure as the force exerted by the liquid is equal to 1950 × .0625 or 121.87 pounds, the ball seating force of spring 61 i. e. 62.5 pounds, will still be overcome.

As the ball 54 moves off its seat, the push rod 38 will follow ball 54 and the ball 43 will be moved by the pressure of the flowing liquid thereagainst onto its seat 23 to seal bore 22 so that no liquid can flow to pressure gauge 35. Consequently the latter will not be injured by the high pressure of over 1000 p. s. i. in the line.

In the event the pressure in the line is just slightly over 1000 p. s. i., say 1025 and when ball 54 is initially moved off its seat 24, the pressure in bore 22 adjacent seat 24, drops to say 975 p. s. i. and the pressure in bore 22 adjacent seat 23 drops to say 1005 p. s. i., the force of spring 61, i. e., 62.5 pounds, will be sufficient to overcome the force exerted by the liquid against ball 54 which is equal to 975 × .0625 or 60.94 pounds and the ball will tend to move toward its seat 24. If the ball 54 did seat the pressure in bore 22 would build up to 1025 p. s. i. and the ball 54 would again be unseated for relief of pressure and by reason of the repeated seating and unseating of ball 54, an objectionable chattering would occur, and in addition the pressure gauge would vibrate back and forth with possible injury thereto.

Such objectionable chattering and possibility of injury to the pressure gauge is averted, however, by the construction herein in which the area of ball seat 23 is larger than that of ball seat 24, say by the ratio of two to one, i. e., the ball seat having an area of .125 square inch.

As above described, with a pressure of 1025 p. s. i. in the line, the force urging ball 54 onto its seat after it has initially moved away therefrom is the difference between the spring force of 62.5 pounds and 60.94 pounds (the force exerted by the liquid under a pressure of 975 p. s. i. against ball 54) or 1.56 pounds.

At the same time the force exerted against ball 43 to seat the latter is equal to the difference between the product of the liquid pressure of 1025 p. s. i. and the effective area of the ball 43 (which is equal to the area of ball seat 23), i. e., .125 or 128.125 pounds and the opposed force of the product of the pressure of the liquid in bore 22 or 1005 p. s. i. and the effective area of ball 43 or .125, i. e., 125,625. Thus the difference is equal to 128.125 — 125.625 or 2.5 pounds which is in direction to seat ball 43 and which will oppose the counterforce of 1.56 pounds.

Consequently the ball 43 will seat to cut off flow of liquid to gauge 35 and the push rod 22 will retain ball 54 off its seat so that there will be no chattering and so long as the pressure in the line is above 1000 p. s. i., the flow of liquid to gauge 35 will be cut off to protect the latter.

With the construction above described, a valve is provided which will reliably cut off and retain cut off, the flow of liquid to a pressure gauge so long as the pressure in the line to which the gauge is connected is greater than the maximum permissible limit of said gauge, and which avoids the likelihood of rapid opening and closing of the valve with resultant objectionable chattering and possible injury to the pressure gauge as a result of the vibration therein caused by intermittent flow of liquid due to such rapid opening and closing of the valve.

Although the passageway 33 to which the gauge 35 is connected is completely cut off from the line when ball 43 seats, the pressure in passageway 33 will drop to zero very slowly by reason of the discharge of the accumulator 25 through line 30, port 36, groove 31, bore 22, through open valve 54 and port 63. As a result no injury will be caused to the gauge by reason of a sudden drop in application of pressure thereto.

Similarly, when ball 43 moves off its seat and ball 54 seats when the pressure drops below 1000 p. s. i., the liquid under pressure will flow into the accumulator 25 to charge the latter at the same time as it flows into the gauge 35. Consequently the pressure in passageway 33 will rise slowly and no injury will be caused to the gauge.

As many changes could be made in the above construction, and many apparently widely different embodiments of this invention could be made without departing from the scope of the claims, it is intended that all matter contained in the above description shall be interpreted as illustrative and not in a limiting sense.

Having thus described our invention what we claim as new and desire to secure by Letters Patent of the United States is:

1. A cut-off valve comprising a casing having a longitudinal passageway therethrough having a reduced diameter portion between its ends with a valve seat formed at each end of said reduced diameter portion, a valve associated with each of said seats and movable away therefrom toward the adjacent end of the passageway in said casing, resilient means associated with one of said valves normally retaining the latter on its seat, a rod extending through the reduced diameter portion between said valves and spacing the latter, said rod being of such length that when one of said valves is on its seat, the other valve will be displaced from its seat, said casing having an inlet port leading into the end of said passageway associated with the valve normally displaced from its seat, said casing having a pair of ports, one of said ports being in communication with the passageway between the seat for the normally seated valve and the adjacent end of said passageway and the other of said ports being in communication with the reduced diameter portion of said passageway.

2. The combination set forth in claim 1 in which a bushing is positioned in said passageway, said bushing having a longitudinal bore defining the reduced diameter portion of said passageway, said bushing having an annular groove therein substantially midway between its ends, and a transverse bore extending through said bushing bore and leading into said annular groove, said last named port being in communication with said annular groove.

3. The combination set forth in claim 2 in which the passageway in said casing has an annular shoulder and a fitting screwed into the end of said passageway adjacent the other seat and abutting against an end of said bushing, retains the latter against said shoulder.

4. The combination set forth in claim 3 in which said fitting has a bore therethrough coaxial with said casing passageway and a cavity in communication with said bore, at the end of said fitting abutting against said bushing, said normally displaced valve being a ball positioned in said cavity.

5. The combination set forth in claim 3 in which said fitting has a bore therethrough coaxial with said casing passageway and a cavity in communication with said bore, at the end of said fitting abutting against said bushing, said fitting end having a slot therein leading into said cavity, said normally displaced valve being a ball positioned in said cavity, and a strainer plug is positioned in said fitting bore between the outer end of said fitting and said cavity.

References Cited in the file of this patent

UNITED STATES PATENTS

| | | |
|---|---|---|
| 1,409,116 | Sammis | Mar. 7, 1922 |
| 2,200,830 | Behauell et al. | May 14, 1940 |
| 2,361,773 | Knapp | Oct. 31, 1944 |
| 2,404,102 | Schultz | July 16, 1946 |
| 2,531,669 | Burnett | Nov. 28, 1950 |
| 2,610,647 | Maglott | Sept. 16, 1952 |